L. CROSSLAND.
CARD GAME.
APPLICATION FILED SEPT. 18, 1920.
1,415,019.
Patented May 9, 1922.
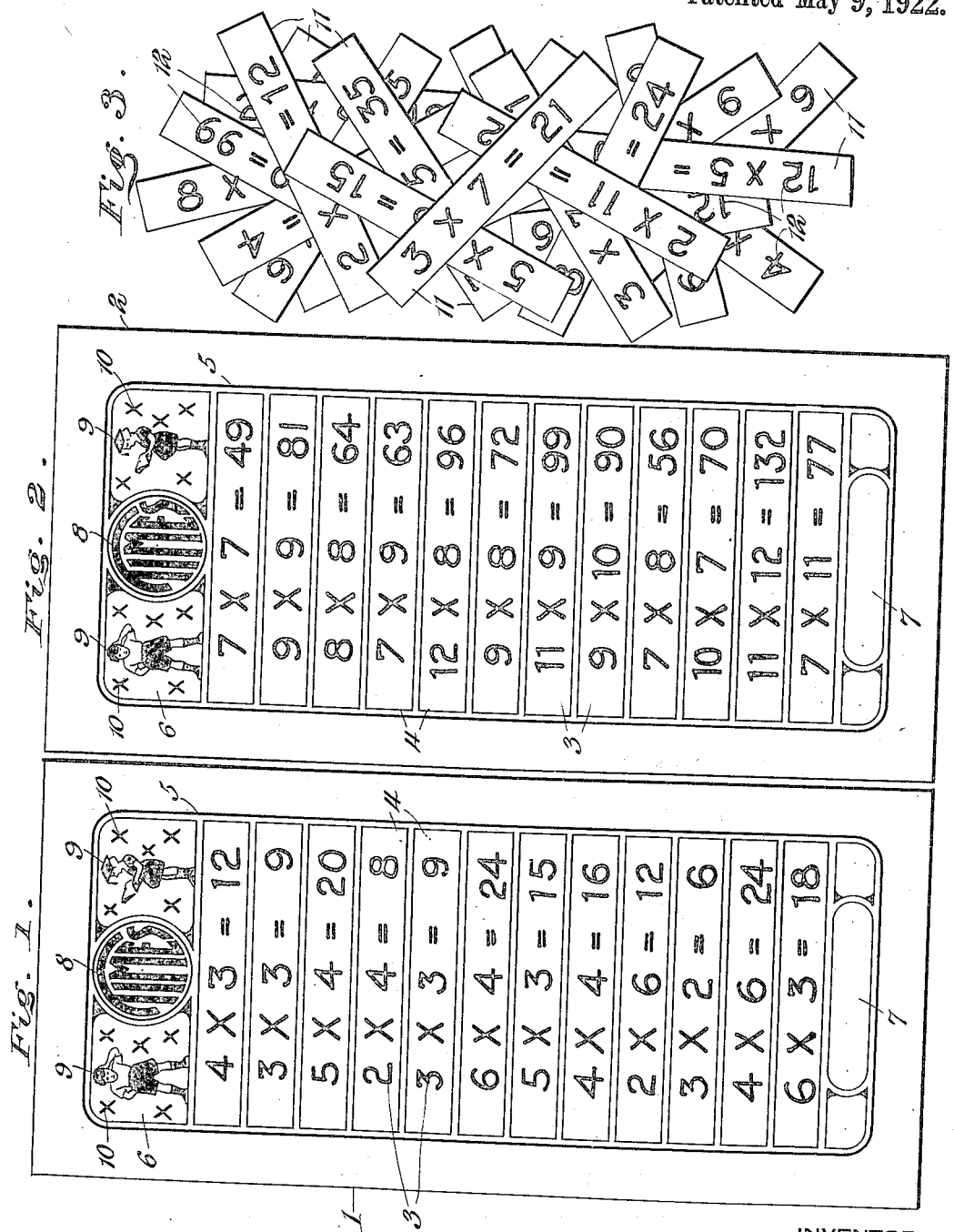

UNITED STATES PATENT OFFICE.

LORENA CROSSLAND, OF PHILADELPHIA, PENNSYLVANIA.

CARD GAME.

1,415,019.

Specification of Letters Patent.

Patented May 9, 1922.

Application filed September 18, 1920. Serial No. 411,036.

*To all whom it may concern:*

Be it known that I, LORENA CROSSLAND, a citizen of the United States, residing at Philadelphia, in the county of Philadelphia and State of Pennsylvania, have invented a new and useful Card Game, of which the following is a specification.

This invention has reference to card games and is designed more particularly for use in teaching young children problems in multiplication, although applicable to problems in division, addition and subtraction. The game is designed primarily for teaching children the multiplication tables and is so designed that it may be used for the lower multiplication tables, say from 1 to 6 for beginners, and up to 12 for more advanced pupils.

In order to relieve the study of the multiplication tables from the usual drudgery of learning them by rote, the multiplication tables are presented to the eye of the pupil in printed form with the elements of the multiplication table divided into single, simple problems which may be grouped and presented to the eye of the pupil in the form of a game, whereby particular attention is called to each problem and the pupil unconsciously learns the various problems without onerous concentration or monotonous repetition.

The invention comprises a series of cards each containing a group of problems, with the number of cards such that all the problems of the multiplication table may be placed thereon, the cards each containing an equal number of problems. The invention also contemplates the use of a number of slips or tags each with a single problem thereon, with each slip containing a different problem from any of the others.

By providing a suitable number of cards and an appropriate number of slips, the game may be played by two, three or more persons, with the player first completing the cards winning the game, or any other suitable arrangement may be provided for playing the game.

The invention will be best understood from a consideration of the following detailed description taken in connection with the accompanying drawing forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is a face view of a card suitable for playing the game.

Fig. 2 is a similar view of another card containing different indicia from the first card, but otherwise the same.

Fig. 3 is a view representing a pile of tags containing like problems to the playing cards and designed to assist in the playing of the game.

Referring to the drawings, there is shown in Figs. 1 and 2 two playing cards designated by the reference numerals 1 and 2 respectively. These cards may be of cardboard or even of paper with imprints 3 thereon representing problems, and framed in rectangles 4, with all the imprints and their bordering rectangles enclosed in marginal lines 5. Other frames or enclosures 6—7 are provided for various purposes, which need not be particularly referred to, and a space 8 is provided for the name of the game, which may obviously be called "Times" because referring to the question of multiplication. Furthermore, various indications 9—10 may be exhibited in the spaces 6 pictorially representative of the game.

For the playing of the game there are provided, in addition to the cards 1 and 2 or more cards of like character, an appropriate number of slips or tags 11, each having an imprint 12 thereon corresponding to the imprints 3 on the game cards 1, 2, etc.

In preparing a full set of the playing cards 1, 2, etc., twelve such cards are provided, and each playing card contains twelve different imprints or legends 3, each different from the other legends of the card and each different from all the other imprints or legends of all the other cards. The twelve playing cards contain the separate problems found in a full multiplication table from 1 to 12 while the imprints or legends employed for younger or less advanced pupils carry only the multiplication tables from 1 to 6 and require only six playing cards 1, 2, etc. Fig. 1 shows the card for the younger pupils, while Fig. 2 represents the card for the older ones.

The game is played by two or more pupils and a dealer, or may be played by two persons only, with one acting as a dealer, or by more than three persons, with one acting as a dealer and three or more having the large cards 1, 2, etc.

In order to play the game, one person is selected as the drawer and deals to each of the other players one or more of the large cards, 1, 2, etc. In case only two persons are playing, the drawer takes one of the large cards.

The tags 11 are thrown into a box or into a pile on the table, whereupon the drawer takes one tag and calls out the combination printed upon it. The players then examine their respective cards, 1, 2, etc., and if one of them finds the duplicate combination on his card he announces the fact and the drawer hands him a tag which the player then covers the combination printed on his card.

The described procedure is repeated until one of the players has all of the combinations on his card covered with tags. The first player to have his card thus covered is declared the winner of the game.

In order to easily distinguish the tags, when placed upon the card, from the card itself, the tags and cards may be printed in different colors.

Since the game is designed particularly for very young children, all element of skill and of complications have been eliminated. The game may be played by very young children so that they may unconsciously learn the multiplication table, which is one of the most troublesome tasks of children.

What is claimed is:

1. A card game for educational purposes comprising cards having an orderly arrangement of problems, each occupying a line on the card, and a number of mating slips or tags each corresponding in size to the space occupied by a problem on the card and having one of the problems thereon, with the slips separate from the cards and from each other, whereby each player may be provided with a card and the slips may be separately drawn to be placed upon and cover the corresponding problems on the card.

2. An educational card game comprising cards each with a series of multiplication table problems thereon arranged in a column and a series of separate mating slips each with one of the problems thereon corresponding in size to the space occupied by a problem on one of the cards, and there being provided as many slips as there are problems on the cards.

3. An educational card game, comprising a plurality of cards, each having a column thereon made up of line problems taken from the multiplication tables with each problem different from each of the others, and mating slips or strips corresponding in number to the number of problems on the cards employed in the game, with the problems all different and each corresponding to some one of the problems displayed on the cards, said slips adapted to be placed upon a problem on the cards corresponding to a problem on the mating slips.

4. An educational card game, comprising a plurality of cards, each with imprints thereon of a plurality of multiplication table problems each different from the others and arranged in columns, with each card having the same number of problems as each other card, and separate mating tags or slips each having a multiplication table problem thereon corresponding to one of those on the cards, each problem on the cards having an enclosing printed box and each tag or slip being of a size corresponding to that of the box, so as to cover the problem on the card where the slip or tag is placed thereon.

In testimony that I claim the foregoing as my own I have hereto affixed my signature.

LORENA CROSSLAND.